United States Patent

Linehan et al.

(10) Patent No.: US 10,417,564 B2
(45) Date of Patent: Sep. 17, 2019

(54) GOAL-ORIENTED PROCESS GENERATION

(71) Applicant: International Business Machines Corporation, Armonk, NY (US)

(72) Inventors: Mark H. Linehan, Yorktown Heights, NY (US); Florian Pinel, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 280 days.

(21) Appl. No.: 15/255,830

(22) Filed: Sep. 2, 2016

(65) Prior Publication Data

US 2016/0371586 A1    Dec. 22, 2016

Related U.S. Application Data

(63) Continuation of application No. 14/063,405, filed on Oct. 25, 2013, now Pat. No. 9,536,196, which is a continuation of application No. 14/026,391, filed on Sep. 13, 2013, now Pat. No. 9,536,195.

(51) Int. Cl.
*G06N 99/00* (2019.01)
*G06N 5/02* (2006.01)
*G06N 20/00* (2019.01)

(52) U.S. Cl.
CPC .............. *G06N 5/02* (2013.01); *G06N 20/00* (2019.01)

(58) Field of Classification Search
CPC ......... G06N 5/02; G06N 5/003; G06F 9/4843
See application file for complete search history.

(56) References Cited

U.S. PATENT DOCUMENTS

| | | |
|---|---|---|
| 5,890,133 A | 3/1999 | Ernst |
| 6,003,020 A | 12/1999 | Hazlehurst et al. |
| 6,125,363 A | 9/2000 | Buzzeo et al. |
| 6,604,141 B1 | 8/2003 | Ventura |
| 7,496,927 B2 | 2/2009 | Hammer et al. |
| 7,506,302 B2 | 3/2009 | Bahrami |
| 7,580,946 B2 | 8/2009 | Mansour et al. |
| 7,970,729 B2 | 6/2011 | Cozzi |
| 8,924,269 B2 | 12/2014 | Seubert et al. |
| 9,536,195 B2 * | 1/2017 | Linehan ............... G06N 5/02 |
| 9,536,196 B2 * | 1/2017 | Linehan ............... G06N 5/02 |
| 2005/0021348 A1 | 1/2005 | Chan et al. |
| 2005/0091093 A1 | 4/2005 | Bhaskaran et al. |

(Continued)

OTHER PUBLICATIONS

E. Santos et al., "A Goal-Oriented Approach for Variability in BPMN," Workshop Em Engenharia De Requisitos (WER), Apr. 2010, 11 pages, Cuenca, Ecuador.

(Continued)

*Primary Examiner* — Charles R Kasenge
(74) *Attorney, Agent, or Firm* — Robert Bunker; Ryan, Mason & Lewis, LLP

(57) ABSTRACT

An apparatus comprises a memory and a processor device operatively coupled to the memory. The processor device is configured to receive a set of process metrics, evaluate the set of received process metrics to determine a set of process classifications, determine a set of process parameters, and generate one or more processes based at least in part on the set of process parameters and the set of process classifications, each of the one or more processes having respective sets of process metrics similar to the set of received process metrics.

20 Claims, 6 Drawing Sheets

(56) References Cited

U.S. PATENT DOCUMENTS

| | | |
|---|---|---|
| 2005/0147946 A1 | 7/2005 | Ramamurthy et al. |
| 2006/0106825 A1 | 5/2006 | Cozzi |
| 2007/0214030 A1 | 9/2007 | Shear et al. |
| 2008/0082569 A1 | 4/2008 | Mansour et al. |
| 2009/0125345 A1 | 5/2009 | Schmitz |
| 2010/0174583 A1 | 7/2010 | Passova et al. |
| 2010/0312768 A1 | 12/2010 | Shear et al. |
| 2011/0078426 A1 | 3/2011 | Stoitsev |
| 2011/0145738 A1 | 6/2011 | Laugwitz et al. |
| 2012/0109708 A1 | 5/2012 | Mueller et al. |
| 2014/0188566 A1 | 7/2014 | Pinel et al. |
| 2014/0379434 A1* | 12/2014 | Zangwill ............ G06Q 10/0637 705/7.36 |

OTHER PUBLICATIONS

Saeed Ahmadi Behnam, "Goal-Oriented Pattern Family Framework for Business Process Modeling," University of Ottawa, Oct. 2012, 179 pages, Ottawa, Ontario, Canada.

* cited by examiner

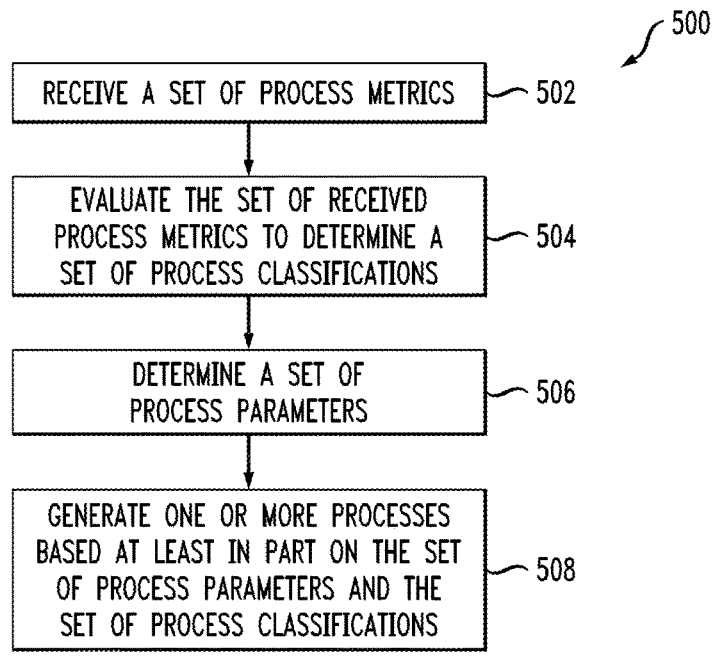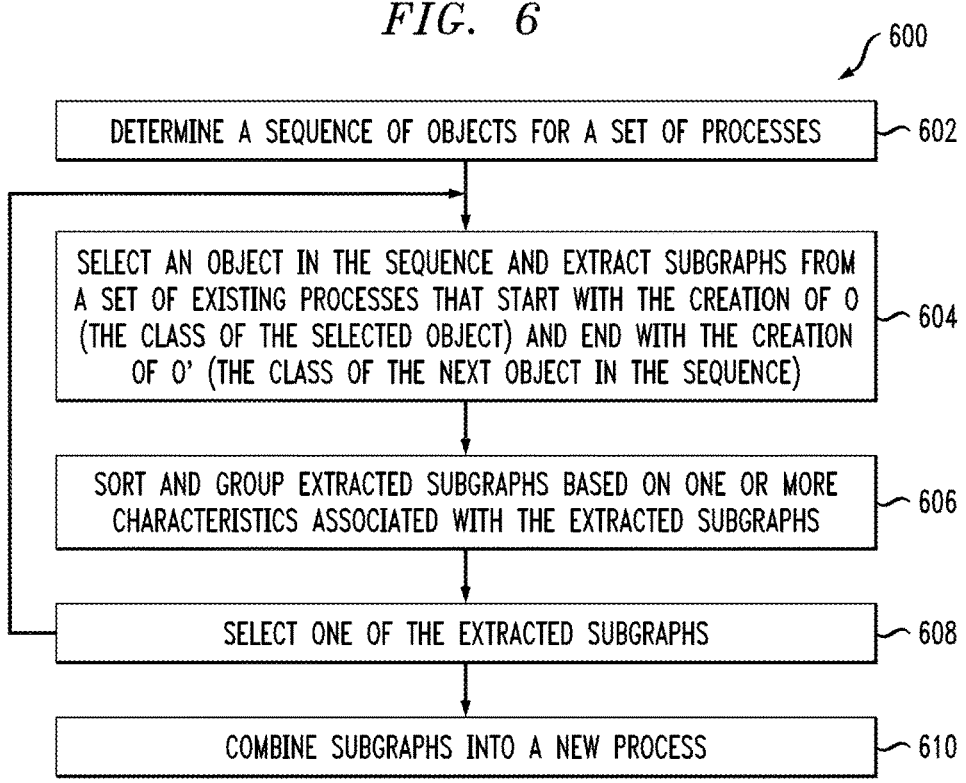

GOAL-ORIENTED PROCESS GENERATION

CROSS-REFERENCE TO RELATED APPLICATIONS

This application is a Continuation of U.S. patent application Ser. No. 14/063,405, filed on Oct. 25, 2013, which is a Continuation of U.S. patent application Ser. No. 14/026,391, filed on Sep. 13, 2013, the disclosures of which are fully incorporated herein by reference.

FIELD

The field relates to computational creativity and, more particular to techniques for generation of processes.

BACKGROUND

A wide variety of entities use a set of processes to perform common tasks and deal with particular issues. For example, a business such as an insurance company may have a standard process for dealing with new claims. Retail businesses may have standard processes or policies for customer service and support. New and existing businesses and other entities may create new processes to handle new tasks and issues or to replace obsolete or underperforming processes. As a business or other entity grows or expands, new or updated processes may also be needed. Mergers of entities may require creation of new processes to handle interaction among sub-entities or divisions of an entity. New and changing regulations, laws and standards may also require the creation of new processes.

The creation of business processes, policies and other procedures is performed manually. Consultants or other individuals and entities responsible for the creation of business processes, policies and procedures typically use portfolios of industry best practices or existing processes from a former project as a basis for the manual creation of new business processes, policies and procedures.

SUMMARY

According to one embodiment of the invention, a method comprises the steps of receiving a set of process metrics, evaluating the set of received process metrics to determine a set of process classifications, determining a set of process parameters, and generating one or more processes based at least in part on the set of process parameters and the set of process classifications, each of the one or more processes having respective sets of process metrics similar to the set of received process metrics. The receiving, evaluating, determining and generating are performed by at least one processing device.

According to another embodiment of the invention, an article of manufacture comprises a computer readable storage medium for storing computer readable program code. The computer readable program code, when executed, causes a computer to receive a set of process metrics, evaluate the set of received process metrics to determine a set of process classifications, determine a set of process parameters, and generate one or more processes based at least in part on the set of process parameters and the set of process classifications, each of the one or more processes having respective sets of process metrics similar to the set of received process metrics.

According to another embodiment of the invention, an apparatus comprises a memory and a processor device operatively coupled to the memory. The processor device is configured to receive a set of process metrics, evaluate the set of received process metrics to determine a set of process classifications, determine a set of process parameters, and generate one or more processes based at least in part on the set of process parameters and the set of process classifications, each of the one or more processes having respective sets of process metrics similar to the set of received process metrics.

These and other embodiments of the invention will become apparent from the following detailed description of illustrative embodiments thereof, which is to be read in connection with the accompanying drawings.

BRIEF DESCRIPTION OF THE DRAWINGS

FIG. 5 illustrates a methodology of process generation, according to an embodiment of the invention.

FIG. 6 illustrates a methodology of a portion of process generation, according to an embodiment of the invention.

DETAILED DESCRIPTION

Illustrative embodiments of the invention may be described herein in the context of illustrative methods, systems and devices for the generation of new processes. However, it is to be understood that embodiments of the invention are not limited to the illustrative methods, systems and devices described but instead are more broadly applicable to other suitable methods, systems and devices.

As used herein, the term "process" is understood to broadly refer to a sequence of tasks for achieving a desired output based at least in part on one or more inputs. Processes may include, by way of example, methods, procedures, practices, policies, etc. for the pursuit of one or more objectives or goals. While embodiments of the invention are described primarily in the context of the generation of business processes, embodiments are not limited solely for use in generating new business processes. For example, embodiments may be used for the generation of new processes in recreational or social contexts.

The term "entity" as used herein is understood to broadly refer to any individual or group of individuals that is created or formed to achieve some purpose, examples of which include but are not limited to an undertaking, an endeavor, a venture, a business, a concern, a corporation, an establishment, a firm, an organization, etc. An entity performs a process in the course of attempting to achieve a purpose or goal.

Advantageously, embodiments of the invention provide methods, systems and apparatus for automatically generating new processes. Embodiments may utilize inspirational examples from a knowledge database in conjunction with user input, defined process parameters, and process metrics in the generation of new processes. Embodiments provide several advantages relative to conventional techniques. For example, new processes can be generated with less manual effort than that of conventional techniques. Human resources represent a finite quantity, which can limit the amount of new processes which are created, increase the cost or time required to create new processes, etc. In addition, embodiments can increase the potential for discovery of new ways to achieve one or more goals or other objectives.

Figure 1:
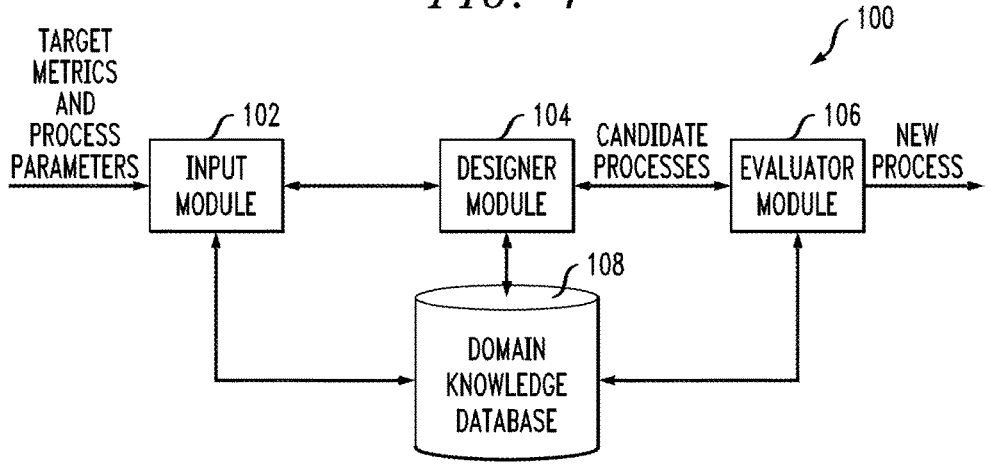
FIG. 1 illustrates a system for process generation, according to an embodiment of the invention.

FIG. 1 illustrates a system 100 for process generation. The system 100 includes an input module 102, designer module 104, evaluator module 106 and domain knowledge database 108.

Input module 102 is configured to receive input regarding target metrics and process parameters, as well as input and feedback from users. The input module 102 is operative to communicate with designer module 104. Designer module 104 can generate a set of candidate processes using the target metrics and process parameters supplied by the input module 102. Designer module 104 provides the candidate processes to an evaluator module 106. The evaluator module 106 selects one of the candidate processes as the new process.

Each of the input module 102, designer module 104 and evaluator module 106 may be implemented using hardware, software or a combination of hardware and software running on one or more computing or other processing devices. The input module 102, designer module 104 and evaluator module 106 in system 100 are also connected to a domain knowledge database 108, and are configured to read from and store information in the domain knowledge database 108 for use in generating new processes.

The domain knowledge database 108 may be contained in a database server, cloud storage, networked storage or a physical memory of a server or workstation. Thus, it is to be appreciated that the domain knowledge database 108 shown in FIG. 1 may be implemented on the same or different physical server(s) or workstation(s) as one or more of the input module 102, designer module 104 and evaluator module 106.

The domain knowledge database 108 stores information relating to existing processes. The information may include data relating to the particular tasks, objects and actors involved in existing processes, and various other information relating to processes such as feedback data or quality assessments of existing processes. The domain knowledge database 108 may also contain information relating to process parameters or other constraints of existing processes, as well as portions of existing processes.

In some embodiments, the domain knowledge database 108 includes a dataset of inspirational examples of processes, with lists of the sequence of objects, tasks connecting objects, and actors performing tasks in existing processes. The information stored in the domain knowledge database 108 may also relate to quality metrics and assessments of existing processes, such as cost, effectiveness, speed, etc. The domain knowledge database 108 may also include information relating to particular objects, actors and tasks generally and in association with particular types of processes.

Figure 2:
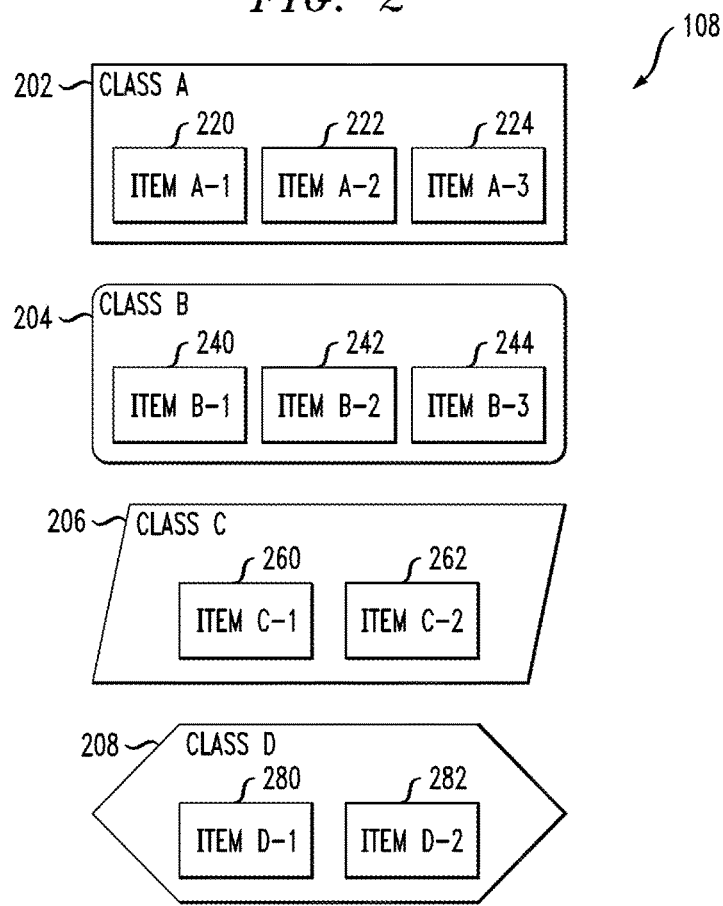
FIG. 2 illustrates classification of items, according to an embodiment of the invention.

Existing objects, actors, tasks and processes in domain knowledge database 108 may be clustered into categories using one or more dimensions. FIG. 2 illustrates an example of clustering using four classes—class A 202, class B 204, class C 206 and class D 208. Class A is a first cluster of items, and contains item A-1 220, item A-2 222 and item A-3 224. Class B is a second cluster of items including item B-1 240, item B-2 242 and item B-3 244. Class C is a third cluster containing item C-1 260 and item C-2 262 while class D is a fourth cluster including item D-1 280 and item D-2 282. Although not explicitly shown in FIG. 2, particular ones of the items may be associated with multiple classes. In addition, classes may be subdivided into subclasses. The particular numbers of items in classes A, B, C and D in FIG. 2 is shown by way of example. Classes are not limited solely to two or three items, but instead may contain less than two or more than three items.

Figure 3:
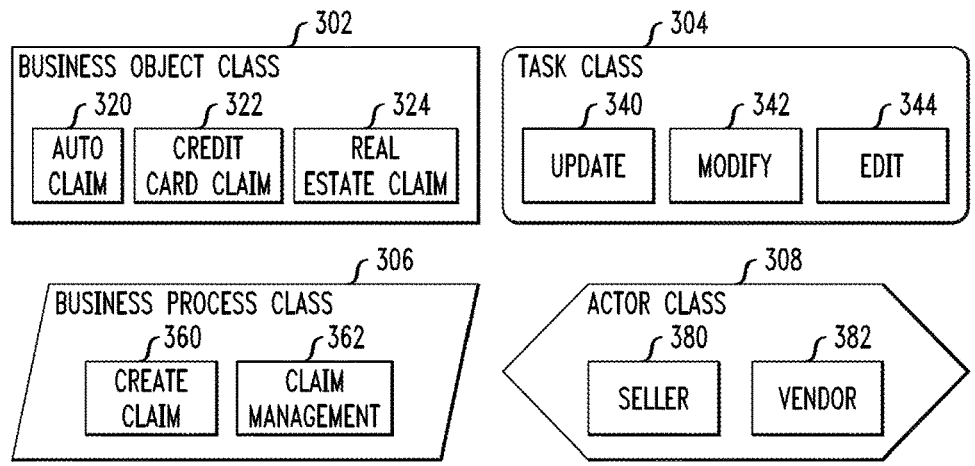
FIG. 3 illustrates an example of classification of business objects, tasks, actors and processes, according to an embodiment of the invention.

FIG. 3 illustrates an example of classification of business objects, tasks, actors and processes. FIG. 3 shows four classes, including a business object class 302, task class 304, business process class 306 and actor class 308. The business object class 302 is a "claim" class, and includes the items of auto claim 320, credit card claim 322 and real estate claim 324. The task class 304 is an "update" class, including the items of update 340, modify 342 and edit 344. The business process class 305 is also a "claim" class, and includes the items of create claim 360 and claim management 362. The actor class 308 is a "seller" class and include the items of seller 380 and vendor 382.

The domain knowledge database 108 may use a task naming convention of Verb+Business Object (BO) for clustering objects into classes. A lexical database, such as WordNet®, may be used to group verbs and BO nouns with a similar meaning. Alternatively or additionally, text similarity or ontology techniques may be utilized for clustering objects. Similarly, tasks, actors and processes may be clustered using a lexical database or other text similarity or ontology techniques, including combinations of these techniques. For example, the update task class 304 in FIG. 3 includes three items, update 340, modify 342 and edit 344, which have a similar meaning.

Business processes may have a naming convention which is similar to that of the task naming convention described above. As such, similar techniques may be used for clustering business classes. Various other techniques, however, may also or alternatively be used for clustering business processes. For example, processes may be clustered based on their respective inputs and outputs. By way of example, a process that outputs a claim BO but does not use a claim BO as an input is most likely a claim creation process and may be clustered accordingly. Various other techniques, including crowdsourcing, may be utilized for clustering or clustering refinement in domain knowledge database 108.

Figure 4:
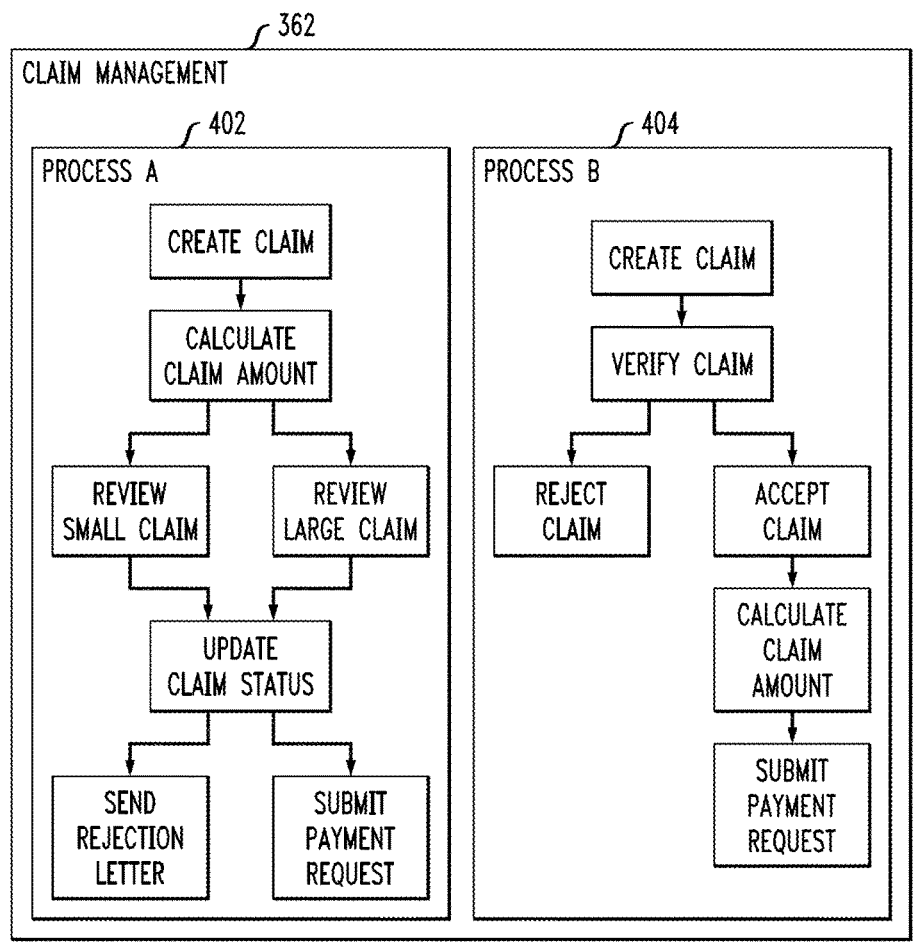
FIG. 4 illustrates an example of claim management business processes, according to an embodiment of the invention.

FIG. 4 illustrates the subclass of "claim management" business processes 362. Claim management class 362 includes process A 402 and process B 404. Each of process A and process B relates to claim management. For example, process A begins with creation of a claim, and proceeds with calculating a claim amount. Based on the claim amount, two different review procedures may be utilized, one for small claims and one for large claims. After claim review, the claim status is updated and a rejection letter is sent or a payment request is submitted. Process B similarly begins with creation of the claim, and proceeds to claim verification. After claim verification, the claim is rejected or accepted. If accepted, the claim amount is calculated and a payment request is submitted. As will be appreciated, each of process A and B can be utilized for managing insurance claims. Processes A and B can be clustered based on their topic, e.g., claim management, and further clustered based on their input and output tasks or objects. For example, processes A and B each have an input task of claim creation and an output task of submitting a payment request.

The domain knowledge database 108 may further classify and cluster objects and tasks within existing business processes. Objects may be clustered by the kind of action they perform (e.g., by task), by the actor who performs the task, by respective inputs and outputs of the business object, etc.

For example, in process A each object may be considered a "claim" business object. The "create claim object" has a task class of "create," an output of "claim" and no input. The create claim object may be associated with a "customer support representative" actor.

The calculate claim amount object has a task class of "compute," an input of "claim" and an output of "claim." The actor for the calculate claim amount object may be "computer" or "automated."

The review small claim object and review large claim object of process A are each associated with a task class of "review" and have respective inputs and outputs of "claim." Objects in the review task class, including the review large claim object and review small claim object, may be associated with an "auditor" actor. The auditor actor class may be further divided into "senior auditor" and "junior auditor." The "senior auditor" actor may be associated with the review large claim object while the "junior auditor" actor may be associated with the review small claim object.

The update claim status object has a task class of "update" and thus can be clustered with other tasks in task class 304. The update claim status object has an input of "claim" and an output of "claim."

Each of the send rejection letter object and submit payment request BO has a task class of "create" and an input of "claim." The send rejection letter BO has an output of "letter" while the submit payment request BO has an output of "payment request."

The BOs of process B may similarly have inputs, outputs, actors and tasks classes associated therewith. These classes may be used for clustering the business processes themselves, as well as for clustering types of BOs, actors, tasks, etc. in the domain knowledge database 108. It is also important to note that classes of BOs, actors, tasks, etc. may be subdivided. As described above, the "auditor" actor class may be subdivided into senior and junior auditors. BOs, actors and tasks may also be associated with multiple classes. As an example, the send rejection letter and submit payment request objects may be both "claim" BOs and "task resolution" BOs. Various other objects, actors and tasks may be associated with multiple classes.

The following is an example of how the system 100 may utilize clustered information such as that shown in FIGS. 3 and 4 for the generation of a new process. Input module 102 of system 100 may receive a target metric or business goal of flood insurance claim management for a reseller of claim insurance. The input module 102 may also receive process parameters. By way of example, the process parameters may include a requirement that the process use an initial quick claim verification procedure to weed out certain types of fraudulent claims as well as detailed claim review procedures based on a calculated claim amount.

Input module 102 may provide these target metrics and process parameters to the domain knowledge database 108. The knowledge database 108 may return one or more classifications based on the input, such as that the target metrics relate to the claim business object class 302 and the claim management business process class 362. The domain knowledge database 108 may also classify the reseller of claim insurance as an actor in the seller class 308. The input module 102 may pass this classification information together with the target metrics and process parameters to the designer module 104.

Designer module 104 queries the database using the received classifications to determine and analyze a set of inspirational examples of claim management processes for sellers. Such a query may return processes A and B in the claim management class. Using these processes, as well as other process parameters, the designer module 104 generates a number of candidate processes. The designer module 104 may combine one or more tasks or sequences of tasks from processes A and B to generate candidate processes. For example, the candidate process may include a sequence of BOs connected by tasks similar to that of process B but where objects and tasks after the calculate claim object in process B are replaced with the review small claim, review large claim, update claim status, send rejection letter and submit payment request objects of process A. Various other target metrics, process parameters and clusters may be utilized other than those described in the specific example described above. In addition, while described above with respect to BOs, other types non-business objects, actors, tasks and processes may be clustered in the domain knowledge database 108.

FIG. 5 illustrates a methodology 500 of new process generation. The methodology 500 begins with step 502, receiving a set of process metrics. As described above, the process metrics may include a business goal for a new business process to be generated. The methodology 500 may be implemented using the system 100. By way of example, step 502 may be performed by the input module 102 of system 100.

The methodology continues with step 504, evaluating the set of received process metrics to determine a set of process classifications. Step 504 may be performed by the input module 102 of system 100 by querying the domain knowledge database 108. As an example, the business goal may be to create a new process for product order submission. Evaluation of this business goal may result in a set of process classifications including "create" and "sales." The set of process classifications may further include a statistical analysis of BOs, actors and tasks commonly involved in the "create" and "sales" classes.

Next, a set of process parameters is determined 506. Step 506 may also be performed by input module 102. The set of process parameters may be determined from the statistical analysis described above. For example, the process parameters may include one or more process inputs and one or more process outputs. The process parameters may further include a numeric range of objects, actors or tasks (or object classes, actor classes and task classes) to be included in the new process. The process parameters may also include specific objects, actors and tasks (or object classes, actor classes and task classes) which should be included or excluded from the new process.

The set of process parameters may also be determined based at least in part on user input. For example, the set of process classifications determined in step 504 may be presented to a user, and the user may provide one or more process parameters in response.

The methodology 500 continues with step 508, generating one or more processes based at least in part on the set of process parameters and the set of process classifications. Step 508 may be performed by the designer module 104 in system 100. In some embodiments, two or more processes referred to as candidate process herein, are generated. A particular one of the candidate processes may be selected as the new process based on a comparison of its process metrics with those of the process metrics received in step 502.

Each candidate process may be evaluated to determine a set of process metrics associated therewith. The candidate processes may be filtered such that only those candidate processes with process metrics similar to the set of received process metrics are selected.

Similarity between process metrics may be determined using a number of techniques, including combinations of the various techniques described below. For example, a set of classifications associated with the set of received metrics may be compared with the process metrics for the candidate processes to determine similarity. In addition, the set of received process metrics may specify a target efficiency level, which may be measured by the compatibility of candidate processes with existing infrastructure of an entity or other policies, procedures and processes associated with the entity.

In some embodiments, process metrics may include expected cost or duration. The set of received metrics may specify that a generated process include less than a certain number of tasks or involve fewer than a certain number of different actors. The number of tasks and actors involved in a process corresponds generally to the expected cost or duration of the process. In some instances, however, a series of tasks performed by one actor may have a shorter expected duration than a single task performed by another actor. For example, a series of two or more tasks which are automated or performed in parallel may have an expected cost or duration which is less than a single task which is performed manually. Similarly, the cost of performing a first series of tasks with multiple actors may have a lower expected cost or duration than a second series of tasks performed by a single actor. As an example, a series of tasks performed by multiple lower-level employees may be less costly than a single task which must be performed by a manager or other higher-level employee within an entity.

There may also be tradeoffs between cost and duration. For example, introducing parallelism to tasks in a process may lower an expected duration of the process while also increasing the expected cost of the process. Various thresholds may be utilized to evaluate the tradeoff between expected cost and expected duration, and may be specified in the set of process metrics. The target process metrics may specify respective weights to apply to cost and duration metrics. As an example, a cost metric and duration metric may be equally weighted to achieve a balance between cost and duration. In some instances, cost may be more important than duration and thus a cost metric may have a weight associated therewith which is greater than a weight associated with a duration metric, or vice versa.

The set of received process metrics may also specify a level of desired novelty or quality for the new process. One example of a novelty metric is a surprise metric. In some contexts, a user may desire that newly-generated processes be familiar or similar to other processes used by an entity. In other contexts, a user may want newly-generated processes to be surprising (e.g., new or exciting). As an example, a business goal or set of process metrics may be specified for replacing an underperforming process, policy or procedure within an entity. In this case, the process metrics may indicate that a newly-generated process should be highly novel or surprising. As another example, a business goal or set of process metrics may be specified for creating a new process in an area where an existing business is expanding. In this case, the process metrics may indicate that the newly-generated process should have low novelty such that the newly-generated process is familiar or similar to other processes, policies and procedures of the business. Various other examples are possible.

The novelty of a process may be quantified by considering a prior probability distribution of existing process and the change in that probability distribution after a new process is generated and observed, i.e., the posterior probability. As will be appreciated, novelty can be relative. For example, a new process may be novel to some users but familiar to others. To achieve novelty for a particular user, the prior probability distribution may include processes from an entity or entities associated with the particular user.

In some embodiments, Bayesian surprise is utilized to calculate surprise or novelty metrics. Let M be a set of existing processes known to an observer. Let M∈M be a process in the set of known existing processes, and let A be a newly-generated process being observed. The Bayesian surprise can be calculated using the following equation:

$$\text{Bayesian surprise} = \int_M p(M|A) \log \frac{p(M|A)}{p(M)} dM \quad (1)$$

where p denotes a probability distribution function.

Similarity between quality metrics in the set of received process metrics and the quality metrics of candidate processes may be evaluated using an expected error or defect ratio. As an example, in the process A shown in FIG. 4 a claimant may contest a rejected claim, which would result in the claim being reopened. Thus, an error ratio associated with the review small claim object may be a ratio of the number of small claims which are reopened relative to the total number of small claims processed. The review large claim object may have a similar error ratio associated therewith, which compares the number of large claims which are reopened relative to the total number of large claims processed. The verify claim object in process B may also have an error ratio associated therewith corresponding to the total number of claims reopened relative to the total number of claims processed. These error ratios may be used as a guideline or reference point for comparison whenever the same or similar objects appear in a newly generated process. In the context of a manufacturing process, a defect ratio may be associated with particular manufacturing operations or tasks. As an example, a given operation may be expected to produce a particular percentage of defective products. In some embodiments, an error or defect ratio of a group of two or more tasks or objects may be utilized.

Similarity may also be determined using user feedback. For example, the evaluator module 106 may utilize feedback or other data in domain knowledge database, as well as direct querying of users, to receive indications of similarity between the set of received process metrics and process metrics of the candidate processes.

Figure 7:
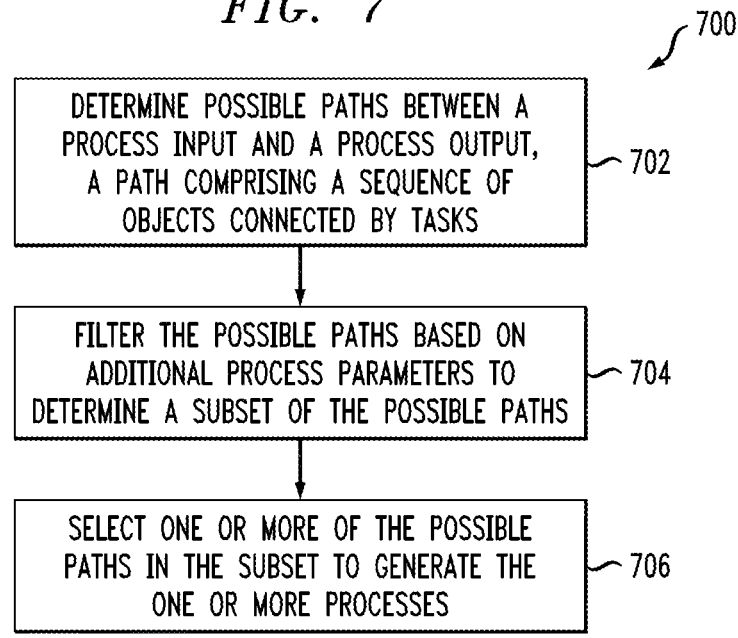
FIG. 7 illustrates a methodology of object sequence generation, according to an embodiment of the invention.

FIG. 6 illustrates a methodology 600 of a portion of process generation. The methodology 600 is an example of the processing of step 508 in methodology 500. First, sequences of objects for a set of processes are determined 602. FIG. 7 illustrates a methodology 700 for determining sequences of objects for sets of processes, which will be described in detail below.

Figure 8:
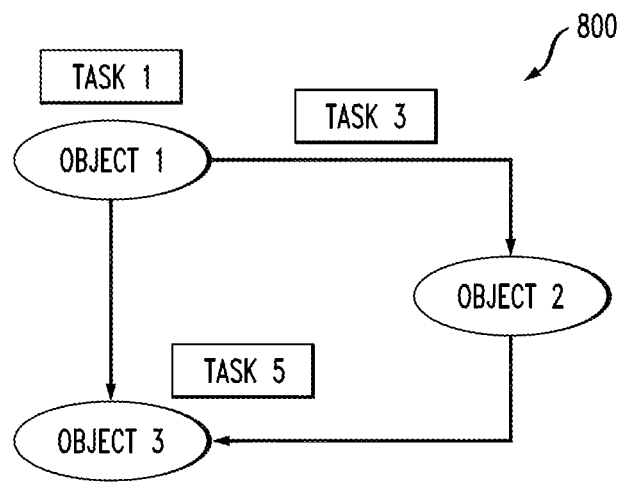
FIG. 8 illustrates an example of an object sequence, according to an embodiment of the invention.
Figure 9:
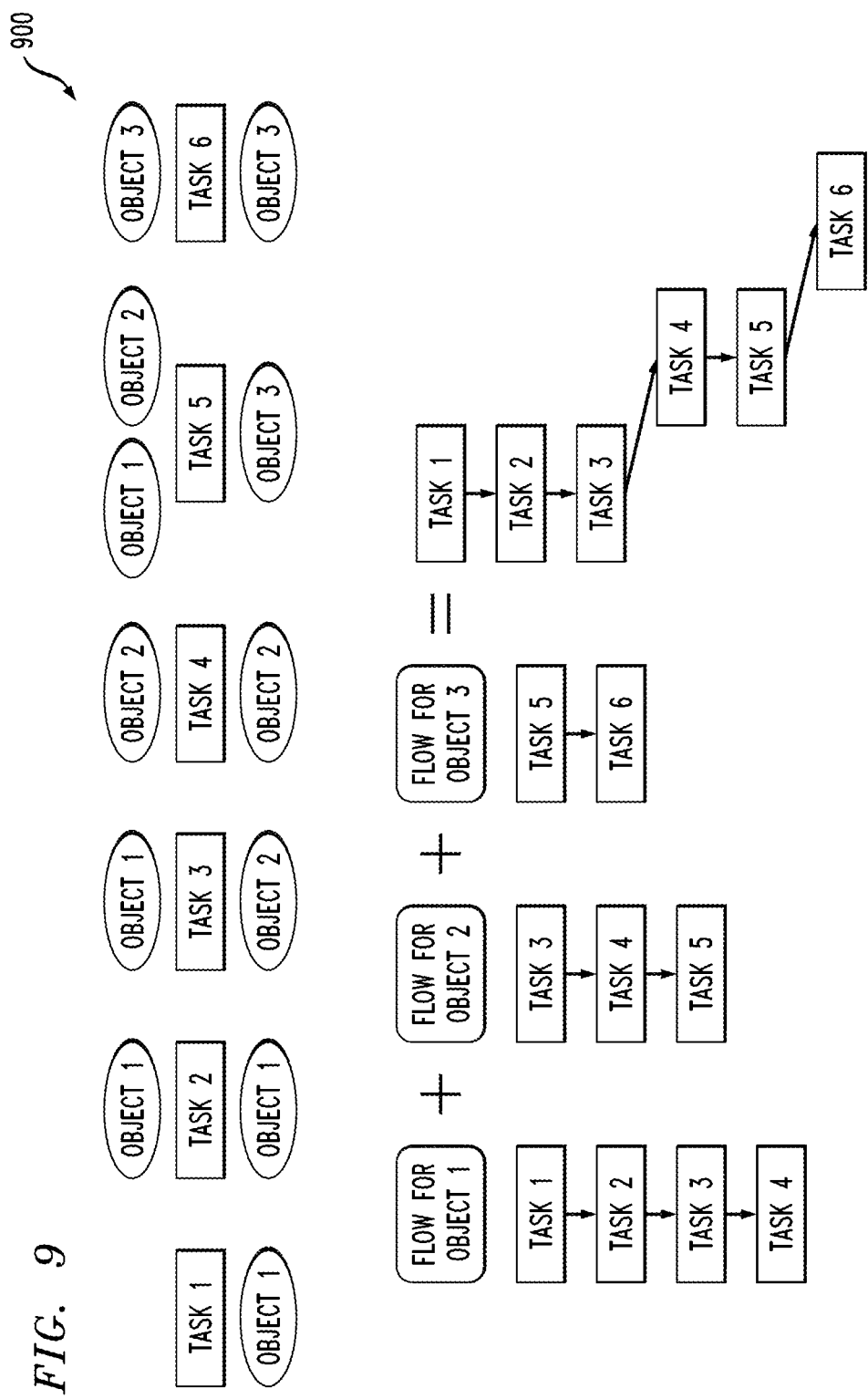
FIG. 9 illustrates an example of object sequence subgraph combination, according to an embodiment of the invention.

After determining the sequence of objects, the methodology 600 loops through object classes in the sequence. Let O be the current object class, and let O' be the object class of the next object in the sequence. In step 604, an object in the sequence is selected, and subgraphs are extracted from a set of existing processes. Processes, as described above, may be represented by a series of objects connected by tasks. The series of objects connected by tasks may be represented by a graph. Subgraphs represent portions of existing graphs or processes, and contain a number of objects connected by tasks. More generally, a subgraph identifies a relationship between one or more process inputs and one or more process outputs. Different subgraphs may have different numbers of objects and tasks to transition a process from one or more inputs to one or more outputs. FIGS. 8 and 9, as will be discussed in further detail below, show examples of an object sequence and subgraph combination.

The subgraphs which are extracted from existing processes in step 604 start with the creation of O, the class of the currently selected object, and end with the creation of O', the class of the next object in the sequence. The methodology 600 continues with step 606, where the extracted subgraphs are sorted and grouped based on one or more characteristics associated with the extracted subgraphs.

Various characteristics may be utilized to sort extracted subgraphs. By way of example, the subgraphs may be sorted based on frequency of occurrence. Subgraphs may alternatively be sorted by the number of tasks, objects or actors in the respective subgraphs. Combinations of characteristics may also be used to sort subgraphs.

Subgraphs may also be grouped together in a number of ways. For example, similar subgraphs may be grouped together. Similarity may be determined by a path edit distance between subgraphs, similarity of tasks or actors associated with objects in the sequence, etc.

The methodology 600 continues with step 608, selecting one of the extracted subgraphs. The extracted subgraph may be selected based on the sorting characteristics. For example, the subgraph which occurs most frequently may be selected. A representative subgraph from the largest or most frequent group of subgraphs may also be selected. The number of tasks and objects in the sequence can also be used to select the subgraph. In some embodiments, user input may be utilized for selecting one of the extracted subgraphs. For example, a user may be presented with a number of subgraphs and asked to select one of the subgraphs. Alternatively, the user may be asked to discard one or more subgraphs. User input may also be obtained indirectly. As an example, user-defined process parameters (e.g., tasks that should or should not be included in a generated process) can be utilized to filter the extracted subgraphs. Various other techniques may be utilized for selecting the subgraph, including combinations of the techniques described above.

The methodology 600 then returns to step 604 and the next object in the sequence is selected. Steps 604-608 are repeated for each object in the sequence, until a sub-graph for each object has been selected. The methodology 600 then continues with step 610, combining the selected subgraphs into a new process. After combining the subgraphs, the resulting process may be refined and optimized. For example, redundant tasks may be removed or eliminated from the resulting process. In addition, parallelism may be added wherever possible so as to improve the efficiency of the process. Various other techniques may be utilized for optimizing or refining the process.

The methodology 600 may be repeated two or more times to generate a number of candidate processes, with one of the candidate processes being selected in the manner described above. For example, each candidate process may be evaluated to determine its respective process metrics or goals to determine how closely they match the received (e.g., target) process metrics or goals. In addition, each task, actor or object in the candidate processes may be assigned a cost. As described above, tasks which require multiple actors may have a higher cost associated therewith than a task which may be automated or performed by only a single actor. Tasks which must be performed by a manager or senior employee or individual may have a higher cost associated therewith relative to tasks which may be performed by junior or entry-level employees or individuals. The candidate process with the lowest total cost may be selected.

In some embodiments, the actors associated with tasks may be associated with multiple entities or multiple divisions or groups within an entity. For efficiency, processes which may be performed by a single group or division within an entity, or within a single entity rather than multiple entities, may be considered more efficient. Process metrics may also specify that a process is not to be performed by multiple entities for privacy or security concerns. Process metrics may alternatively require that a particular entity be used for some specific task or class of tasks. For example, a large entity with a dedicated customer support division or contractor may specify that customer support tasks be handled by that division or contractor.

Tasks may also have a time or duration associated therewith. For example, a support phone call may have a time of 15 minutes associated therewith while a support email or chat may have a time of 10 minutes associated therewith. These durations represent an expected amount of time which is required to complete the task. A candidate process with a shorter expected amount of time to complete may be considered lower cost relative to candidate processes with a higher expected amount of time to complete. Various other factors may be utilized for selecting a given candidate process as the newly generated process, including combinations of the factors and techniques described above.

FIG. 7 illustrates a methodology 700 of object sequence generation. The methodology 700 begins with step 702, determining possible paths between a process input and a process output. A path comprises a sequence of objects connected by tasks. A backwards chaining algorithm may be utilized to determine all possible paths between an input and an output, or some set of possible paths. For example, to reduce the time required or computations required to generate new processes, some embodiments may only determine the first x paths between an input and an output. If candidate processes generated using only the first x paths do not have process metrics which are sufficiently similar to the target or received process metrics, additional paths between process inputs and outputs may be determined to generate additional candidate processes. In addition, step 702 in methodology 700 may involve determining possible paths between a single input and multiple outputs, between multiple inputs and a single output, or between multiple inputs and multiple outputs.

Existing processes stored in the domain knowledge database 108 may be utilized for determining paths between sequences of objects. In some embodiments, only processes belonging to a particular process class are used for determining paths. In other embodiments, only processes belonging to the particular process class and other related process classes are used. For example, the process class of insurance claim creation may be related to customer support ticket creation. In still other embodiments, all existing processes may be utilized. This may be advantageous, for example, in instances in which there are relatively few existing processes in the domain knowledge database 108 for a selected process class.

FIG. 8 illustrates an example of an object sequence 800. The object sequence 800 begins with object 1, which is created or is the result of performing task 1. Object 2 is the next object in the sequence, and results from performing task 3 on object 1. Object 3 is the last object in the sequence, and is the result of performing task 5 on object 1 and object 2. It is to be appreciated that FIG. 8 illustrates only one possible example of an object sequence. Various other types of sequences are possible, including sequences of more or less than three objects, sequences with multiple parallel task paths, sequences in which two or more tasks are required to go from a first object to a second object, etc.

Returning to methodology 700, the possible paths between a process input and a process output are filtered 704 based on additional process parameters to determine a subset of the possible paths. As described above with respect to step 506 of methodology 500, various process parameters or constraints may be determined. As an example, a process parameter may exclude certain tasks, objects or actors from inclusion in one or more new generated processes. Thus, paths which include the excluded tasks, objects or actors may be filtered out in step 704. As another example, a process parameter may specify that a particular task, object or actor must be included in the new process, and thus the possible paths may be filtered using this parameter. Various other process parameters may be utilized for filtering the set of possible paths to determine the subset in step 704.

One or more of the possible paths in the subset are selected 706 to generate the one or more processes. Various criteria may be utilized for selecting one of the paths in the subset. For example, the shortest paths or the paths which include the most parallelism may be selected. As another example, the paths which require the fewest actors or the path with the shortest expected duration may be selected.

FIG. 9 illustrates an example 900 of object sequence subgraph combination. In the example 900, it is assumed that six subgraphs are selected in step 608 of methodology 600. Thus, the example 900 illustrates step 610 in methodology 600 for combining the six selected subgraphs. The first subgraph starts with task 1 and results in object 1. The second subgraph starts and ends with object 1 and performs task 2. The third subgraph starts with object 1, performs task 3 and results in object 2. The fourth subgraph starts and ends with object 2 and performs task 4. The fifth subgraph starts with objects 1 and 2, performs task 5 and ends with object 3. The sixth subgraph starts and ends with object 3 and performs task 6.

To combine the objects 1, 2 and 3 into a new process, the task flows for each of objects 1, 2 and 3 are analyzed and the combined. For example, the task flow for object 1 is task 1→task 2→task 3→task 5. The task flow for object 2 is task 3→task 4→task 5, and the task flow for object 3 is task 5→task 6. The resulting task flow is thus task 1→task 2→task 3→task 4→task 5→task 6. FIG. 8 illustrates a combined and optimized view of the resulting object sequence 800. The tasks internal to a given object (e.g., those that begin and end with the same object) are omitted for clarity in the object sequence 800.

It is important to note that one or more steps in FIGS. 5-7 and the methodologies described herein may be performed in parallel or in a different order. For example, steps 502 and 506 in methodology 500 may be performed substantially simultaneously. As another example step 506 in methodology 500 may be performed before step 504. Numerous other examples apply to the various steps in FIGS. 5-7 and the methodologies described herein.

It is to be appreciated that particular features described above with respect to a particular embodiment of the invention are not necessarily limited solely to use in the particular embodiment described. Instead, a single embodiment may include features described above in the context of two or more different embodiments.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 10:
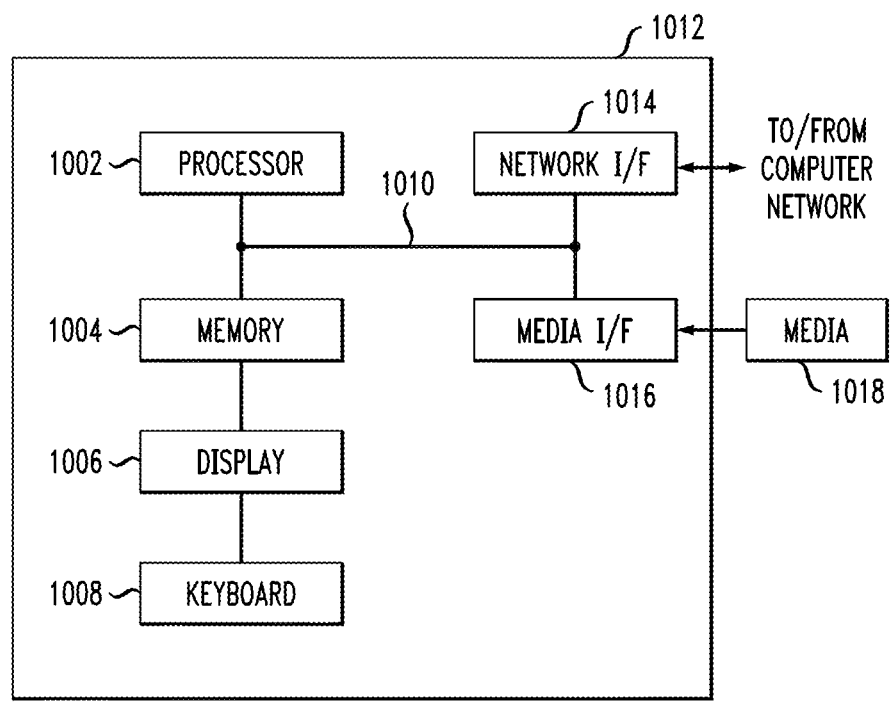
FIG. 10 illustrates a computing device in accordance with which one or more components/steps of techniques of the invention may be implemented, according to an embodiment of the invention.

One or more embodiments can make use of software running on a general purpose computer or workstation. With reference to FIG. 10, such an implementation may employ, for example, a processor 1002, a memory 1004, and an input/output interface formed, for example, by a display 1006 and a keyboard 1008. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to optionally include, for example, one or more mechanisms for inputting data to the processing unit (for example, keyboard or mouse), and one or more mechanisms for providing results associated with the processing unit (for example, display or printer).

The processor 1002, memory 1004, and input/output interface such as a display 1006 and keyboard 1008 can be interconnected, for example, via bus 1010 as part of data processing unit 1012. Suitable interconnections, for example, via bus 1010, can also be provided to a network interface 1014, such as a network card, which can be provided to interface with a computer network, and to a media interface 1016, such as a diskette or CD-ROM drive, which can be provided to interface with media 1018.

A data processing system suitable for storing and/or executing program code can include at least one processor 1002 coupled directly or indirectly to memory elements 1004 through a system bus 1010. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboard 1008 for making data entries; display 1006 for viewing data; a pointing device for selecting data; and the like) can be coupled to the system either directly (such as via bus 1010) or through intervening I/O controllers (omitted for clarity).

Network adapters such as a network interface 1014 may also be coupled to the system to enable the data processing system to become coupled to other data processing systems or remote printers or storage devices through intervening private or public networks. Modems, cable modem and Ethernet cards are just a few of the currently available types of network adapters.

As used herein, a "server" includes a physical data processing system (for example, system 1012 as shown in FIG. 10) running a server program. It will be understood that such a physical server may or may not include a display and keyboard. Further, it is to be understood that components may be implemented on one server or on more than one server.

The flowchart and block diagrams in FIGS. 1-10 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Accordingly, techniques of the invention, for example, as depicted in FIGS. 1-10, can also include, as described herein, providing a system, wherein the system includes distinct modules (e.g., modules comprising software, hardware or software and hardware).

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   receiving a set of process metrics, the set of received process metrics comprising a specified novelty threshold;
   evaluating the set of received process metrics to determine a set of process classifications;
   determining a set of process parameters based at least in part on the set of received process metrics, the set of process parameters comprising at least one novelty metric determined based on the specified novelty threshold, the at least one novelty metric comprising a measure of surprise for a designated user that is calculated based at least in part on a prior probability distribution of existing processes from one or more entities associated with the designated user; and
   generating one or more processes based at least in part on the set of process parameters and the set of process classifications, each of the one or more processes having respective sets of process metrics within one or more designated thresholds of the set of received process metrics;
   wherein the receiving, evaluating, determining and generating are performed by at least one processing device.

2. The method of claim 1, wherein the set of received process metrics comprises a business goal and the one or more processes comprise respective new business processes.

3. The method of claim 1, wherein evaluating the set of received process metrics further comprises determining one or more classifications of objects, tasks and actors commonly associated with the set of process classifications.

4. The method of claim 1, wherein evaluating the process metrics comprises searching a domain knowledge database to determine the set of process classifications.

5. The method of claim 4, wherein the domain knowledge database stores a plurality of objects, actors, tasks and processes clustered by respective classifications.

6. The method of claim 1, wherein the set of process parameters comprises one or more process inputs and one or more process outputs.

7. The method of claim 1, wherein the set of process parameters comprises a numeric range of a number of objects, actors or tasks to be included in the one or more generated processes.

8. The method of claim 1, wherein the set of process parameters comprises one or more objects, actors and tasks to exclude or include in the one or more generated processes.

9. The method of claim 1, wherein determining the set of process parameters comprises:
   presenting the set of process classifications to a user; and
   receiving the set of process parameters from the user.

10. The method of claim 1, wherein generating the one or more processes comprises generating two or more processes and further comprising selecting a given one of the two or more processes.

11. The method of claim 10, wherein selecting the given process is responsive to a comparison of the set of received process metrics with the respective sets of process metrics associated with the two or more processes.

12. The method of claim 10, wherein the set of received process metrics comprises a target cost and a target duration, and wherein selecting the given process is responsive to a comparison of the target cost and target duration with the respective costs and durations of the two or more processes.

13. The method of claim 1, wherein the set of process parameters includes at least one process input and at least one process output and generating the one or more processes comprises:
   determining a set of possible paths between the at least one process input and the at least one process output, wherein paths comprise respective sequences of objects connected by tasks;
   filtering the set of possible paths based on one or more additional process parameters to determine a subset of the possible paths; and
   selecting one or more of the possible paths in the subset to generate the one or more processes.

14. The method of claim 13, wherein a backward chaining algorithm is utilized to determine the set of possible paths.

15. The method of claim 13, wherein generating the one or more processes comprises, for each object in a given one of the selected possible paths:
   determining a first class associated with a currently selected object and a second class associated with a next object in the sequence;
   extracting subgraphs from a plurality of existing processes having one or more of the set of process classifications, each subgraph comprising an object sequence beginning with an object associated with the first class and ending with an object associated the second class; and
   selecting a given one of the extracted subgraphs.

16. The method of claim 15, wherein selecting a given one of the extracted subgraphs comprises sorting the extracted subgraphs by one or more characteristics associated with the extracted subgraphs and selecting the given extracted subgraph based on the sorting.

17. The method of claim 16, wherein the one or more characteristics comprise at least one of a frequency of occurrence of the respective extracted subgraphs and a number of tasks in the respective extracted subgraphs.

18. The method of claim 15, further comprising combining the selected subgraphs for each object in the given path to generate a given one of the one or more processes.

19. An article of manufacture comprising a computer readable storage medium for storing computer readable program code which, when executed, causes a computer to:
   receive a set of process metrics, the set of received process metrics comprising a specified novelty threshold;
   evaluate the set of received process metrics to determine a set of process classifications;
   determine a set of process parameters based at least in part on the set of received process metrics, the set of process parameters comprising at least one novelty metric determined based on the specified novelty threshold, the at least one novelty metric comprising a measure of surprise for a designated user that is calculated based at least in part on a prior probability distribution of existing processes from one or more entities associated with the designated user; and generate one or more processes based at least in part on the set of process parameters and the set of process classifications, each of the one or more processes having respective sets of process metrics within one or more designated thresholds of the set of received process metrics.

20. An apparatus comprising:
a memory; and
a processor device operatively coupled to the memory and configured to:
   receive a set of process metrics, the set of received process metrics comprising a specified novelty threshold;
   evaluate the set of received process metrics to determine a set of process classifications;
   determine a set of process parameters based at least in part on the set of received process metrics, the set of process parameters comprising at least one novelty metric determined based on the specified novelty threshold, the at least one novelty metric comprising a measure of surprise for a designated user that is calculated based at least in part on a prior probability distribution of existing processes from one or more entities associated with the designated user; and
   generate one or more processes based at least in part on the set of process parameters and the set of process classifications, each of the one or more processes having respective sets of process metrics within one or more designated thresholds of the set of received process metrics.

* * * * *